United States Patent [19]
Levinos et al.

[11] 4,189,652
[45] Feb. 19, 1980

[54] BEAM SPLITTER COUPLED CDSE OPTICAL PARAMETRIC OSCILLATOR

[75] Inventors: Nicholas J. Levinos; George P. Arnold, both of Los Alamos, N. Mex.

[73] Assignee: The United States of America as represented by the United States Department of Energy, Washington, D.C.

[21] Appl. No.: 826,903

[22] Filed: Aug. 22, 1977

[51] Int. Cl.$^2$ ............................................. H07M 5/04
[52] U.S. Cl. ................................ 307/428; 331/107 R; 331/94.5 C
[58] Field of Search ................ 307/88.3, 428; 330/4.5; 321/69 R; 331/94.5 C, 107 R

[56] References Cited
U.S. PATENT DOCUMENTS

| | | | |
|---|---|---|---|
| 3,922,561 | 11/1975 | Byer et al. | 307/88.3 |
| 4,061,921 | 12/1977 | Cantrell et al. | 250/423 P |

OTHER PUBLICATIONS

Jacobs et al., "Laser Photochemistry, Tunable Lasers, etc.", 1976, pp. 289-293, Phys. of Quantum Electronics, vol. 4, G-222.
Wenzel et al., "Parametric Oscillator . . . ", 5/76, pp. 1322-1326, Applied Optics, vol. 15, #5, G-250.
Arnold et al., "Parametric Oscillator: A Grating Coupled CdSe OPO", 4/77, pp. 809-810, Applied Optics, vol. 16, #4, G-250.
Byer et al., "Development of Tunable Infrared OPO . . . ", 4/73, Annual Report.

*Primary Examiner*—Nelson Moskowitz
*Attorney, Agent, or Firm*—R. V. Lupo; Edward C. Walterscheid

[57] ABSTRACT

An optical parametric oscillator is disclosed in which the resonant radiation is separated from the pump and output radiation so that it can be manipulated without interfering with them. Thus, for example, very narrow band output may readily be achieved by passing the resonant radiation through a line narrowing device which does not in itself interfere with either the pump radiation or the output radiation.

2 Claims, 5 Drawing Figures

PRIOR ART

SIDE VIEW

BEAM SPLITTER COUPLED CDSE OPTICAL PARAMETRIC OSCILLATOR

BACKGROUND OF THE INVENTION

The invention described herein relates to optical parametric oscillators and more particularly to optical parametric oscillators in which the resonant radiation is separated from the input and output radiation within the cavity resonator.

The nonlinear response of parametric materials to incident radiation provides a useful technique for generating output wavelengths which are not otherwise readily attainable. Furthermore, by proper choice of the input radiation and parametric material and by various techniques for tuning the parametric output, a wide range of wavelengths may be produced. It is thus not surprising that these devices have aroused considerable interest as sources of coherent radiation for use in laser isotope separation processes. This is particularly true where radiation of the desired wavelength is not readily available from a primary laser.

Thus, for example, in laser separation of uranium isotopes using $UF_6$ as the feed gas, it is highly desirable to obtain 16 μm radiation to selectively excite those $UF_6$ molecules containing a particular isotope of uranium. While it is known in the prior art that the requisite 16 μm radiation could be achieved using a CdSe optical parametric oscillator operating on the 2.87 μm input from an HF laser, significant problems exist with the prior art devices in obtaining sufficient output intensity and sufficiently narrow bandwidth of the output 16 μm radiation. The problems associated with the prior art configurations are discussed in more detail in the section of this specification entitled "Optical Parametric Oscillation."

SUMMARY OF THE INVENTION

In its broad scope, our invention encompasses an optical parametric oscillator which comprises in combination (a) a cavity resonator formed by a pair of spaced reflectors, at least one of which is a line selecting element disposed at an angle to the axis of the cavity resonator, (b) a parametric crystal disposed on the axis of the cavity resonator with the C-axis of the crystal forming a desired phase matching angle with the axis of the cavity resonator, (c) means for introducing a pump beam of coherent radiation of a first wavelength into the resonator and through the parametric crystal to produce signal and idler radiation of differing wavelengths than that of the pump beam, and (d) beam splitter means for separating the signal radiation from the pump and idler radiation within the resonator, the beam splitter and the line selecting element being so disposed that only the signal radiation is resonant in the cavity resonator. In a preferred embodiment the line selecting element is a diffraction grating.

Apparatus in accordance with the invention has the following advantages: (1) the resonant radiation is separated from all the others so that it can be manipulated without interfering with them; (2) due to more efficient coupling, the amount of pump energy delivered to the parametric crystal is higher than in the prior art cavity resonators; (3) unlike the prior art grating coupled cavity, moving the grating changes only the cavity wavelength and does not affect the total alignment; and (4) grating damage is avoided since the very energetic pump radiation is not incident on it.

The preferred embodiment is quite useful for producing narrow band 16 μm radiation for laser separation of uranium isotopes from a $UF_6$ feed.

OPTICAL PARAMETRIC OSCILLATION

Figure 1:
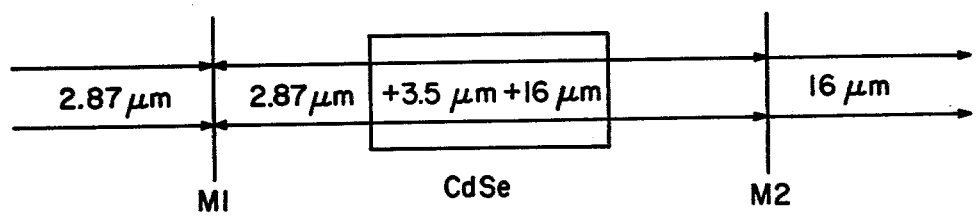
FIG. 1 is a schematic representation of a prior art dichroic mirror coupled optical parametric oscillator used for producing 16 μm output.

An optical parametric oscillator operates as a result of a substantially nonlinear response of an optical material to an input signal. In particular, in the optical portion of the spectrum, including the infrared portion, an optical parametric oscillator or OPO employs a block of optical material that has a substantial second order polarization coefficient. When the input radiation is propagated through this optical material, a wavelike displacement of charge dipoles, i.e., a polarization wave, occurs which generates radiations of different frequencies than that of the input radiation.

The fundamental principles involved in the successful operation of an OPO are the conservation of energy—expressed in the relationship $$\omega_P = \omega_S + \omega_I \tag{1}$$

where $\omega$ is the frequency, subscript P stands for pump, subscript S stands for signal, and I stands for idler (output), and the conservation of momentum—expressed in the relationship $$\vec{k}_P = \vec{k}_S + \vec{k}_I \tag{2}$$

or equivalently $$\vec{n}_P \omega_P = \vec{n}_S \omega_S + \vec{n}_I \omega_I \tag{3}$$

where the n's are the relevant indices of refraction.

In addition, other requirements must be met. The material must be transparent at the wavelengths involved, transparency being governed by any and all effects which tend to reduce the intensity of the radiation. Also, since the OPO is a resonant device, the total gain in the cavity must exceed the total losses.

To achieve the requirements of Eq. (3), the phenomenon of birefringence is used to compensate for the dispersive effects of all materials. This limits the class of materials which may be used to those which are birefringent and also have relatively large nonlinear electrooptic coefficients.

Actually, the index vectors in Eq. (3) will be some combination of Ordinary (O) and Extraordinary (E) rays. Towards that end, the following table contains all the possible polarization combinations which one can generate with three interacting beams.

To reduce the list even further than just eliminating 1 and 8, notice that 3 and 5, as well as 4 and 6, are degenerate; it does not matter which beam is called the signal and which the idler; the names are merely to indicate usage.

TABLE

| No. | $\vec{n}_P$ | $\vec{n}_S$ | $\vec{n}_I$ | Phase Matching |
|---|---|---|---|---|
| 1 | O | O | O | Disallowed because of dispersion |
| 2 | E | O | O | Type II |
| 3 | O | E | O | Type II (CdSe) |
| 4 | E | E | O | Type I |
| 5 | O | I | E | Type I |
| 6 | E | O | E | Type II |
| 7 | O | E | E | Type II |
| 8 | E | E | E | Disallowed because of dispersion |

The particular resulting combination depends on the optical properties of the material to be used—the "type" and magnitude of the birefringence.

The maximum magnitude of the birefringence can be expressed as $$\Delta n = |n^O - n^E| \quad (4)$$

and its classification is determined by $$n^O - n^E > 0 \quad (5)$$

for a negative material, and conversely $$n^O - n^E < 0 \quad (6)$$

for a positive material.

The polar axis (C axis) of the crystal is in the direction where $n^O = n^E$.

The following discussion of crystal fabrication of OPO cavities is directed to the use of CdSe as the parametric material for producing an output wavelength of 16 μm; however, the considerations involved are perfectly general and apply to the use of any parametric material and to a wide range of wavelengths.

Measurement and calculation of the optical properties of CdSe show it to be classified as a positive material which fits the Table at row 3, i.e., Type II phase matching. Using Eq. (1) and Eq. (3) in the more specific form $$\vec{n}_P \omega_P = \vec{n}_S \omega_S + \vec{n}_I \omega_I \quad (7)$$

and selecting the desired $\omega_P$ and $\omega_I$, $\omega_S$ and the various indices can be calculated. Then this information forms the basis for calculating the phase matching angle, that is, the angle between the incident pump beam and the C-axis of the crystal. The rough crystal is oriented properly, then cut and polished in the calculated directions.

Figure 5:
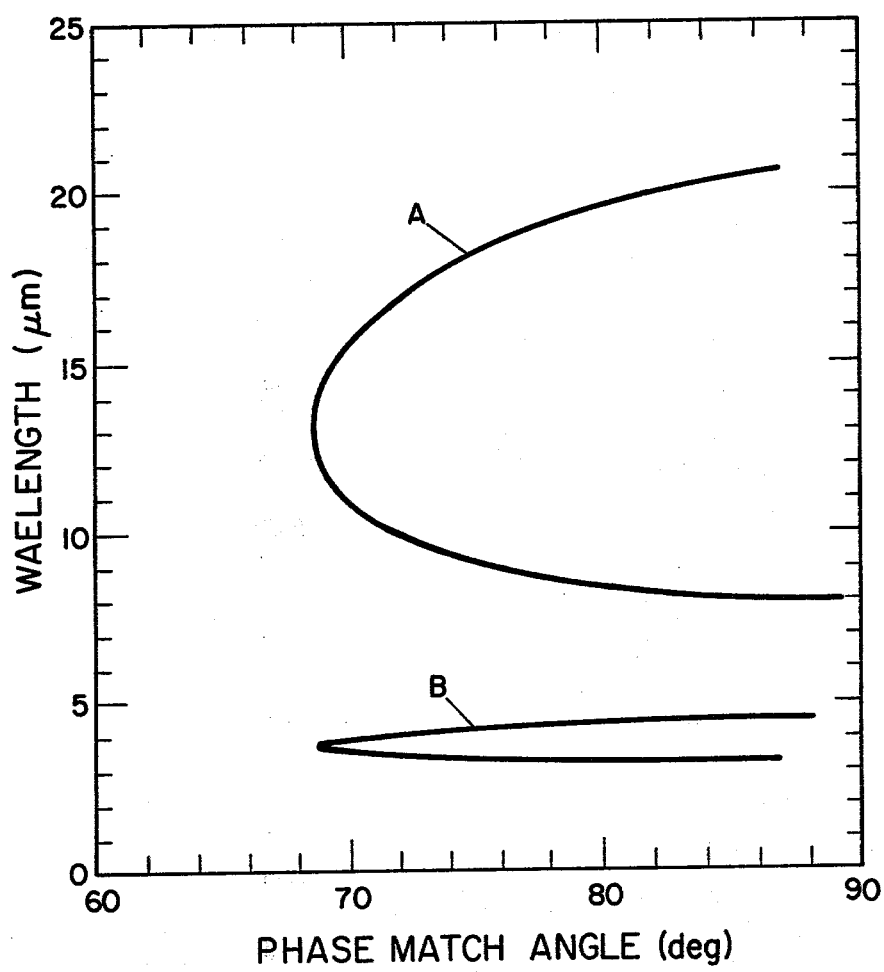
FIG. 5 is the tuning curve for the CdSe used in the preferred embodiment.

For uranium isotope separation using $UF_6$ as the feed material, it is highly desirable to have a narrow band source of 16 μm radiation. The requisite 16 μm radiation can be achieved using a CdSe OPO in which $\omega_P$ is 2.87 μm radiation from an HF laser, $\omega_S$ is 3.5 μm, and the desired $\omega_I$ is 16 μm. FIG. 1 shows one OPO configuration known in the prior art for accomplishing the desired 16 μm output. In an ideal dichroic mirror coupled OPO cavity, mirrors M1 and M2 should ideally have the following transmissivities and reflectivities:

Mirror M1:
@ 2.87 μm 100% Transmission (T)
@ 3.5 μm 100% Reflectivity (R)
@ 4.0 μm 100% T
@ 16.0 μm 100% R
Mirror M2:
@ 2.87 μm 100% R
@ 3.5 μm 100% R
@ 4.0 μm 100% T
@ 16.0 μm 100% T The transmissions at 4.0 μm are desired to prevent parametric oscillation at 4.0 μm and 10 μm, a condition allowed by the phase matching conditions and shown in FIG. 5. As a practical matter, these ideal specifications on reflectivity and transmission cannot be achieved simultaneously. Accordingly, mirror M1 is fabricated to have the highest possible reflectivity at 3.5 μm consistent with the highest possible transmission at 2.87 μm. Mirror M2 is fabricated to have the highest possible reflectivity at 3.5 μm consistent with the highest possible transmission at 16 μm. Unfortunately, this leads to contamination of the 16 μm at the output, especially with 2.87 μm radiation. This problem may be avoided by slightly cocking the cavity with respect to the 2.87 μm pump, thereby making it noncollinear, but giving an angular separation between all three beams.

The difficulties with the cavity of FIG. 1 are manifold. First, the fabrication of the mirrors is extremely difficult, and the end product is still very inefficient, i.e., the output energy of 16 μm radiation is very low compared to the input energy of the 2.87 μm radiation. Second, cocking the cavity to separate the beams reduces the efficiency even further. State-of-the-art mirror coatings are damaged by the pump beam. Finally, there is no way to insert a line narrowing element in this cavity without affecting all the beams. For laser isotope separation, such line narrowing may be highly desirable to achieve the desired narrow band output.

Figure 2:
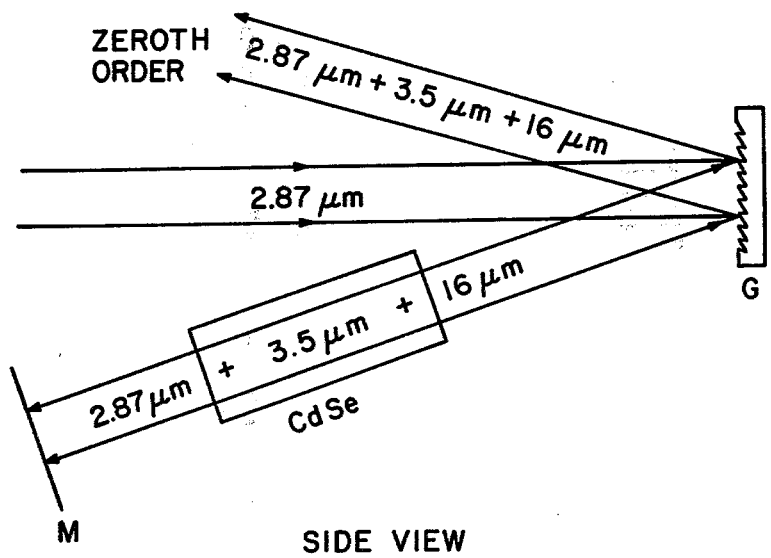
FIG. 2 is a schematic representation of a prior art grating coupled optical parametric oscillator used for producing 16 μm output.

FIG. 2 shows a prior art grating coupled OPO cavity which does not have the fabrication difficulties associated with that of FIG. 1. In addition, the grating G does accomplish line narrowing and selectivity of the resonant 3.5 μm wavelength. This line narrowing of the 3.5 μm radiation automatically narrows the 16 μm line because of the nature of the generating process in CdSe.

Unfortunately, inside the resonant cavity (between M and G) the beams overlap so that no other control elements can be introduced without degrading the performance. Even with the cavity cocked, the beams must overlap inside the crystal for it to operate at all. If the cavity is much longer so that the beams are not overlapping at the mirror M, the threshold of the cavity goes up to a level at which there is no oscillation within the cavity or the required pump increase burns up the crystal and/or the grating G.

BRIEF DESCRIPTION OF THE PREFERRED EMBODIMENT

Figure 3:
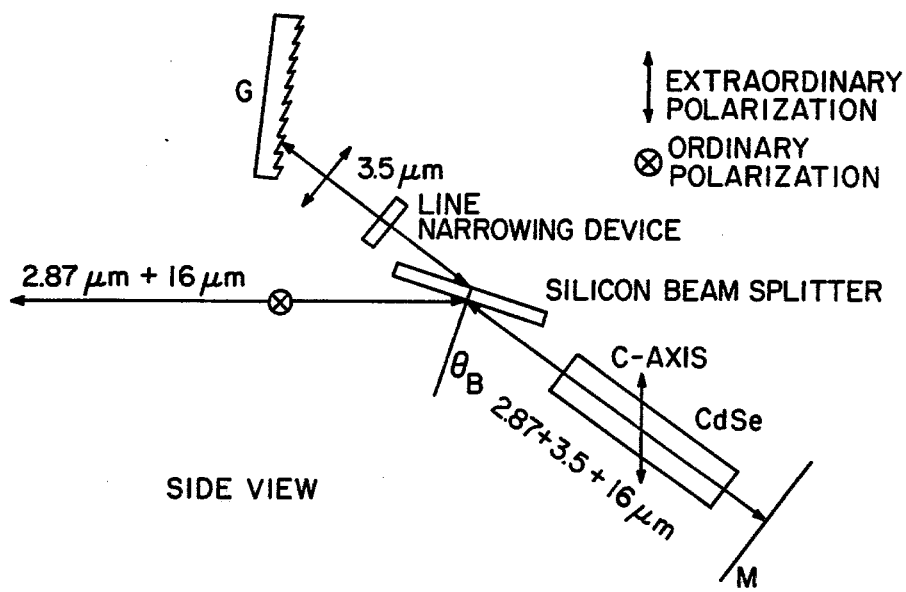
FIG. 3 is a side view of the preferred embodiment of the invention.
Figure 4:
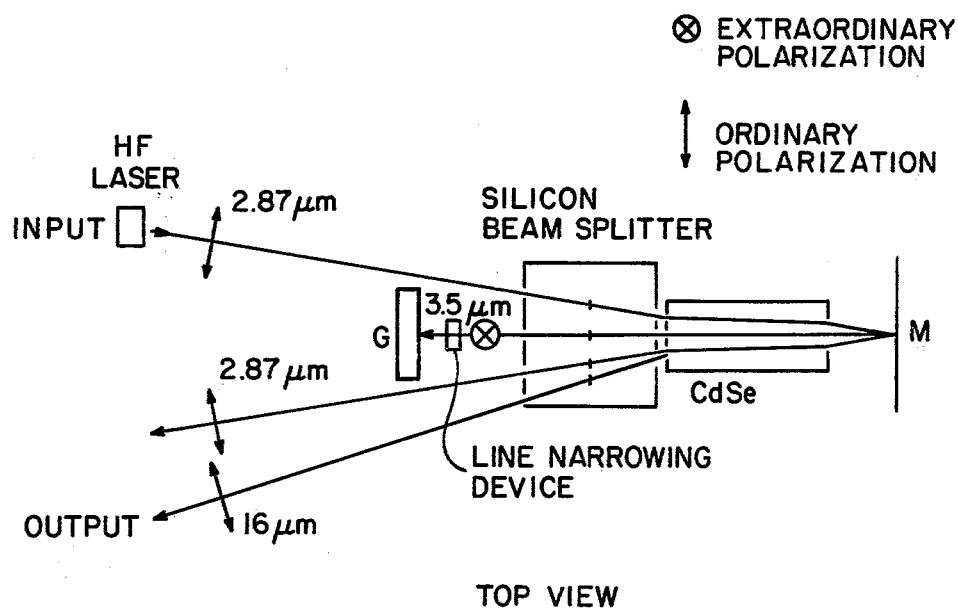
FIG. 4 is a top view of the preferred embodiment of this invention.

The problems associated with the OPO configuration shown in FIGS. 1 and 2 may be avoided through use of the embodiment shown in FIGS. 3 and 4. It can readily be seen that in the configuration shown in FIGS. 3 and 4, the resonant 3.5 μm beam has been separated from the other beams by the silicon beam splitter inside the cavity formed by line selecting element G and mirror M. This permits the resonant signal radiation to be manipulated in a variety of ways. Thus, for example, although the 3.5 μm beam has been selected and narrowed by the line selecting element, further line narrowing can be achieved, if desired, by inserting a line narrowing device such as an etalon in this leg without interfering with the 2.87 μm and 16 μm beams.

The line selecting element G may be any device capable of dispersion for line tuning. It may be a diffraction grating as used in the preferred embodiment shown in FIGS. 3 and 4 or it may, for example, be a prism, a narrow line filter and reflector, or a Fox-Li resonator.

In the embodiment shown in FIGS. 3 and 4, an uncoated sapphire etalon having 0° cut and a thickness of a few mm may readily be used for line narrowing. A temperature control of 1° C. on the etalon is sufficient. Tuning is accomplished by tilting the etalon after the cavity is running at 3.5 μm. The etalon controls the line width of the signal $\omega_S$ which, in combination with the already very narrow pump beam $\omega_P$, controls the linewidth of the idler $\omega_I$. A bandwidth of $\leq 0.15$ cm$^{-1}$ is readily achieved at an idler output of 16 μm stably and efficiently with this control device.

As shown in FIG. 4, this cavity also has to be cocked with respect to the 2.87 μm pump beam so that the 16 μm output beam is separate from the remnant of the reflected 2.87 μm beam.

The horizontally (S) polarized pump first strikes the silicon beam splitter at an angle of incidence which is Brewster's angle for silicon at 3.5 μm. The 2.87 μm is the wrong polarization (P) for minimum reflectivity, so its reflectivity can be closely approximated by $$R_{BS} = [(n^2-1)/(n^2+1)]^2$$

The index of refraction of silicon at 2.87 μm is $$n = 3.4339$$

which results in a reflectivity of 71 percent for this surface. Unfortunately, the refracted 29 percent is sufficient to set up an interference pattern since the beam splitter acts as an etalon.

But if the wedge angle of this beam splitter etalon is less than 20 seconds of arc, the spacing of the interference pattern fringes is wider than the diameter of the beam. By controlling the temperature of the silicon beam splitter, the index of refraction and hence the position of the fringes is also controlled. Thus, maintaining the silicon beam splitter at the appropriate temperature permits any interference pattern problems to be minimized. For silicon, dn/dT is on the order of 10$^{-4}$/°C while dt/tdT is on the order of 10$^{-6}$/°C.

Thus, the variation in thickness with a change in temperature is much less than the variation in the index of refraction caused by the same temperature change. Therefore, the etalon effect of the silicon flat is governed by index of refraction which in turn is a function of the temperature.

For example, a 1 mm-thick silicon flat having a 16 arc second wedge produces fringes perpendicular to the tilt axis with a spacing at 2.87 μm of about 5 mm. The fringe can be traversed completely by a temperature change of 9.5° C. With a beam diameter of about 3.5 mm, a temperature control on the silicon flat of $\leq 0.5°$ C. is sufficient.

FIG. 5 is a tuning curve for the CdSe crystal pumped with a $\omega_P$ at 2.87 μm, showing the variation of $\omega_S$ (curve B) and $\omega_I$ (curve A) with the phase matching angle of the crystal. Note that for a given phase matching angle, $\omega_P$ couples strongly with two different values for $\omega_S$ and thereby generates two $\omega_I$ outputs. These are called the upper and lower branch wavelengths.

In the preferred embodiment, the spectrally very narrow pump beam and the relatively wide signals and idlers emerge from the rear of the crystal, are reflected from mirror M, and reenter the nonlinear CdSe. After passing through in this direction, these very weak signal and idler beams as well as the strong pump beam reach the beam splitter.

The pumps and idlers are S polarized and therefore are highly reflected out of the cavity by the silicon flat serving as the beam splitter. The signals, however, are P polarized and are wholly refracted through the beam splitter. The signals pass through the line narrowing device (if one is present) and are then diffracted by the grating G which is blazed and oriented so that it is in Littrow for 3.5 μm radiation. Therefore, only this wavelength is returned through the silicon beam splitter and back into the CdSe. As a result, only the 3.5 μm beam is resonant in the cavity and quickly increases in intensity. With a pump about 150 nsec long and an optical distance between mirror M and grating G of 22 cm, the 3.5 μm signal beam oscillates in this cavity for about 100 cycles before its source of energy shuts off. This is sufficient time for it to build up a complete mode structure in the cavity and dominate the other signal wavelength. As the intensity of the 3.5 μm signal increases because of its resonance in the cavity, so does the intensity of its associated 16 μm idler.

The scope of the invention is as set forth in the Summary of the Invention and the appended claims and is not limited to the specific embodiments described herein. Such embodiments are merely illustrative of the best mode contemplated for the performance of the invention in producing a desired output wavelength.

What we claim is:

1. Optical parametric oscillator apparatus for producing narrow band 16 μm coherent radiation which comprises in combination (a) a cavity resonator formed by a pair of spaced reflectors, one of which is a line selecting element disposed at an angle to the axis of said resonator, (b) a CdSe crystal disposed on the axis of said resonator, the C-axis of said CdSe forming a phase matching angle of 72° with the axis of said resonator, (c) means for introducing 2.87 μm coherent radiation from an HF laser into said resonator and through said CdSe to produce 3.5 μm signal radiation and 16 μm idler radiation, (d) temperature controlled silicon flat beam splitter means for separating the 3.5 μm signal radiation from the 2.87 μm pump and 16 μm idler radiation within said resonator, said beam splitter means having a wedge angle less than 20 seconds of arc and said beam splitter means and said grating being so disposed that only said signal radiation is resonant in said cavity resonator, and (e) line narrowing means disposed on the axis of said cavity resonator between said grating and said beam splitter means.

2. The optical parametric oscillator of claim 1 wherein said 2.87 μm pump radiation has a pulse length sufficiently long for said 3.5 μm signal radiation to dominate in said cavity resonator.

* * * * *